(No Model.) 5 Sheets—Sheet 1.

T. A. LEE.
FLOOR, ROOF, &c.

No. 500,208. Patented June 27, 1893.

Figure 1:
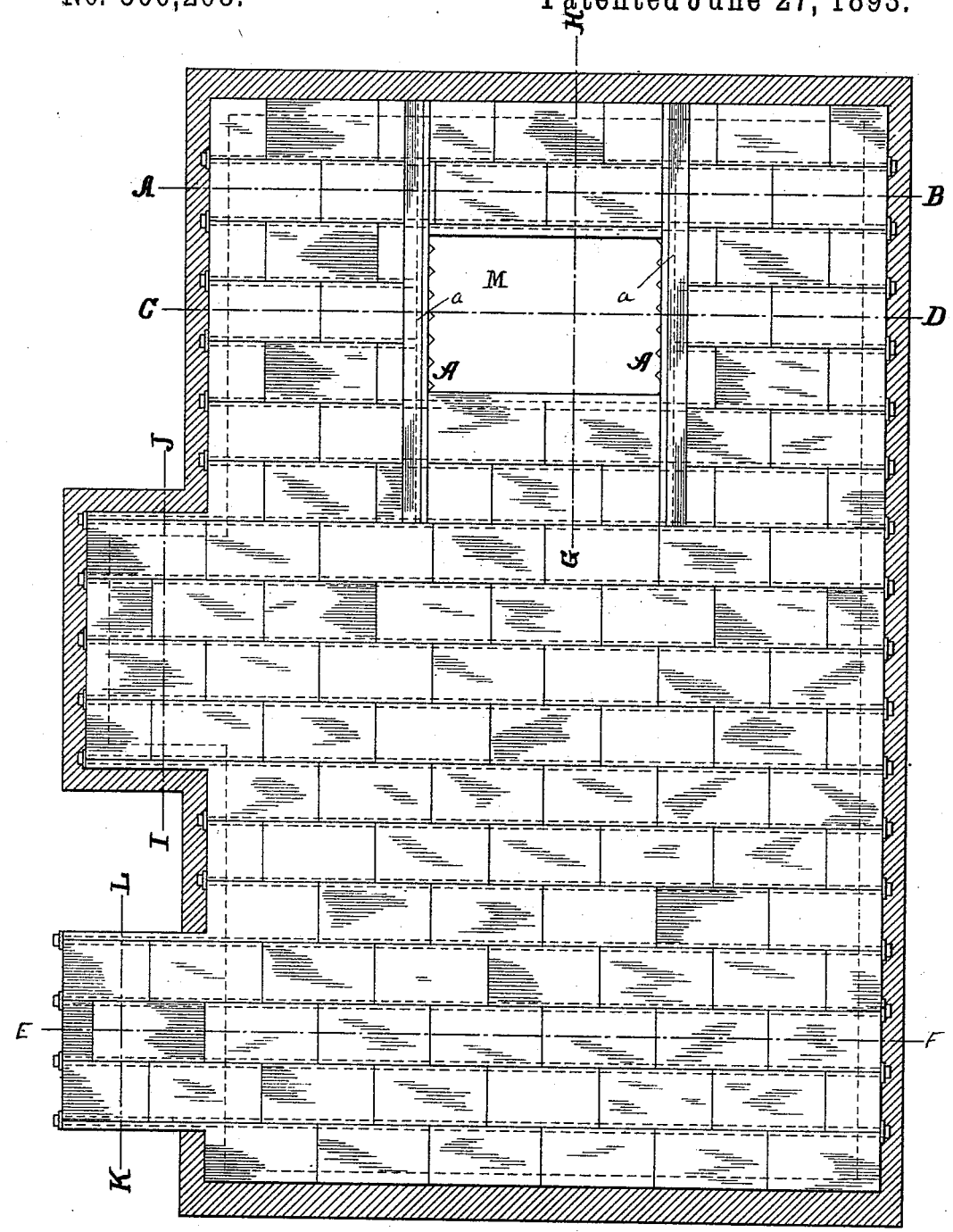

Witnesses. Fig.1. Inventor.
Lewis Searing Thomas A. Lee
Frank E. Shepard by Gilbert M. Plympton,
Atty.

(No Model.) 5 Sheets—Sheet 2.
T. A. LEE.
FLOOR, ROOF, &c.
No. 500,208. Patented June 27, 1893.
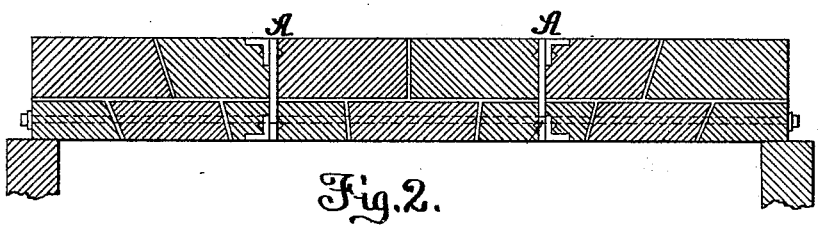
Fig. 2.
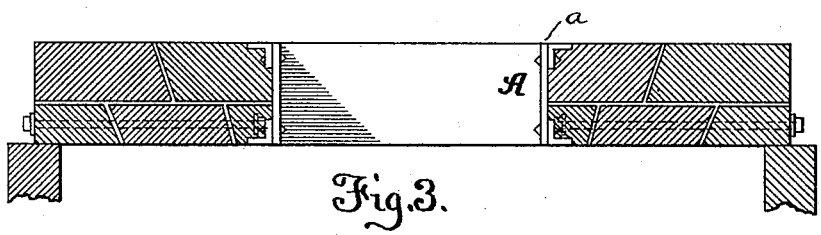
Fig. 3.
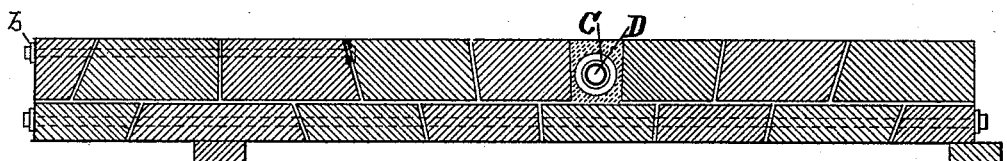
Fig. 4.
Fig. 5.
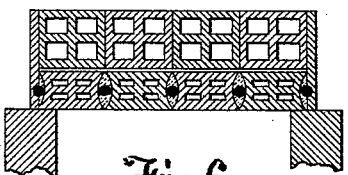
Fig. 6.
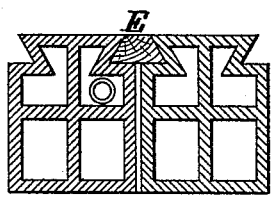
Fig. 8.
Fig. 7.
Witnesses.
Lewis Searing
Frank E. Shepard
Inventor.
Thomas A. Lee,
by Gilbert M. Plympton
Atty.

(No Model.) 5 Sheets—Sheet 3.
T. A. LEE.
FLOOR, ROOF, &c.
No. 500,208. Patented June 27, 1893.
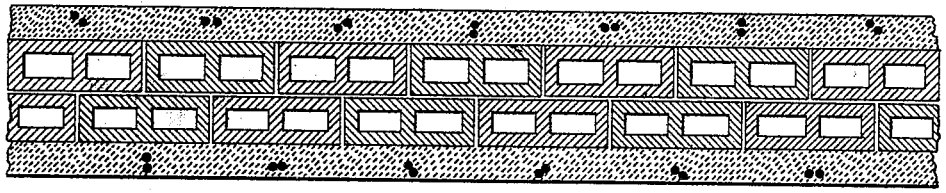
Fig. 9.
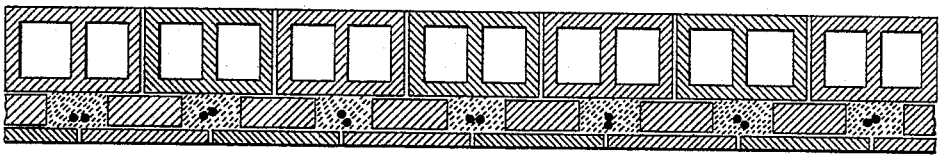
Fig. 10.
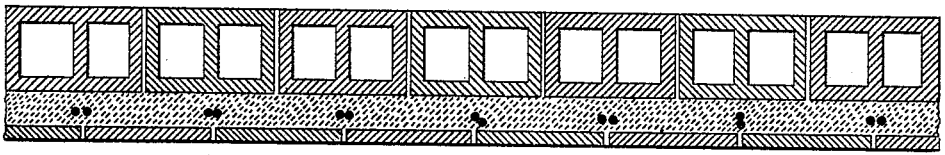
Fig. 11.
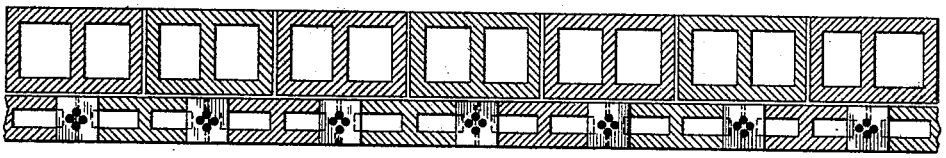
Fig. 12.
Witnesses. Fig. 13. Inventor.
Lewis Searing Thomas A. Lee,
Frank E. Shepard by Gilbert M. Plympton
Atty.

(No Model.) 5 Sheets—Sheet 4.
T. A. LEE.
FLOOR, ROOF, &c.

No. 500,208. Patented June 27, 1893.

Witnesses. Inventor.
Lewis Searing Thomas A. Lee,
Frank E. Shepard by Gilbert M. Plympton
Attys.

(No Model.)  5 Sheets—Sheet 5.

T. A. LEE.
FLOOR, ROOF, &c.

No. 500,208.  Patented June 27, 1893.

Witnesses.
Lewis Searing
Frank E. Shepard

Inventor.
Thomas A. Lee,
by Gilbert M. Plympton
Atty.

THE NORRIS PETERS CO., PHOTO-LITHO., WASHINGTON, D. C.

UNITED STATES PATENT OFFICE.

THOMAS A. LEE, OF NEW YORK, N. Y.

FLOOR, ROOF, &c.

SPECIFICATION forming part of Letters Patent No. 500,208, dated June 27, 1893.

Application filed April 26, 1892. Serial No. 430,759. (No model.)

*To all whom it may concern:*

Be it known that I, THOMAS A. LEE, of New York city, New York, and formerly of Kansas City, Missouri, have invented certain new and useful Improvements in the Construction of Floors, Roofs, Stairways, Arches, and Sidewalks, of which the following is a description, reference being taken to the accompanying drawings, which form a part of this specification.

The object of my invention is to produce strong, light, and durable fire proof structures, without the too frequent employment of iron I-beams and columns, and by my invention even large areas with skylights, openings, and bow window extensions, may be built, leaving the floor free from columns and heavy iron girders.

The principles of my invention are based on the theory of the transverse strength of beams. Inasmuch as terra cotta lumber, or other tile work, which I employ in my construction, is capable of giving all the compressive strength necessary for flooring and the like, I produce strong, durable, structures by the mere addition, in suitable manner, of tension rods so located that they support the tensile stresses and relieve the tile work.

To insure the firm retention of my rods and to relieve the surrounding cement from too great a shearing force, I may provide anchor plates on my rods at suitable intervals, so that the tiling may bear the strain, and I select material for the tiles capable of withstanding the thrusts to which they may thereby be subjected.

Heretofore it has been customary to use, instead of my simple tile and rod work, a series of I-beams, and flat arches of tiling spanning the spaces between such beams, columns being added when needed to support the beams. By my invention these parallel I-beams and supporting columns are completely omitted and weight and cost thereby reduced.

Figures 21, 23:
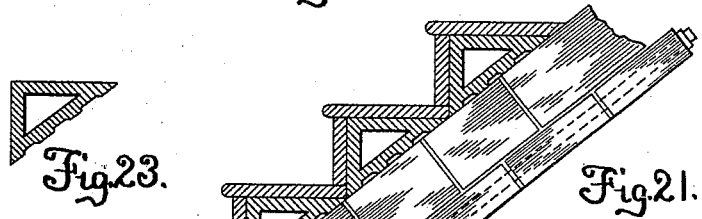
Figure 22:
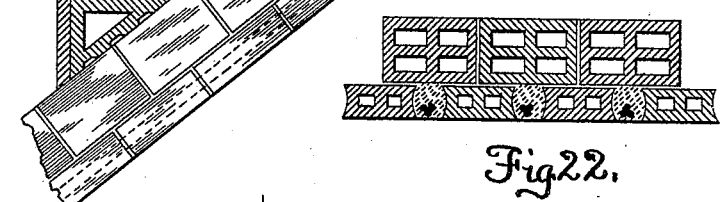
Figure 24:
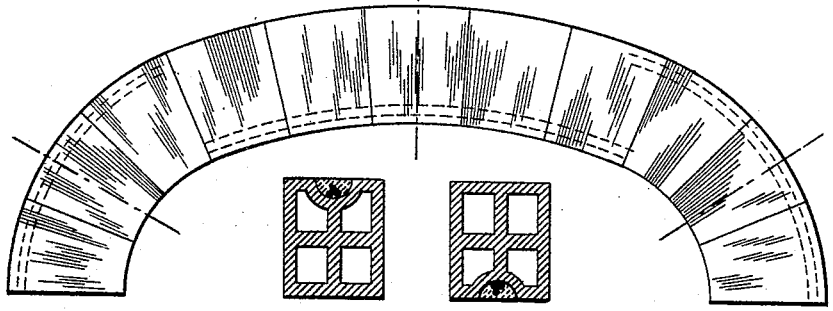

In the drawings, Figure 1 is a plan of a floor showing various details of construction. Fig. 2 is a cross section of the floor taken on line A B of Fig. 1. Fig. 3 is a cross section on line C D; Fig. 4 on line E F; Fig. 5 on line G H across the skylight. Fig. 6 is a cross section on line I J. Fig. 7 is a cross section on line K L. Fig. 8 shows a method of embedding wooden strips for attaching flooring to the tile work. Figs. 9, 10, 11, and 12 are sections of flooring perpendicular to the tension rods, showing modifications of construction. Fig. 13 is a section of the form shown in Fig. 12, and is taken parallel with the tension rods. Figs. 14, 15, 16, 17, 18, 19, and 20, are other modifications shown in section transverse to the rods. Fig. 21 is a cross section of a stairway. Figs. 22 and 23 are details thereof. Fig. 24 shows an arch and cross sections of tilings therefrom taken respectively at the center and at one side of the arch.

In the various views like letters of reference indicate like parts.

In Figs. 1 to 7 inclusive I show the construction of a floor according to one form of my invention. In laying such a floor I first set up a close form suitable to the area to be covered, or with very large areas arranged for but a section of the flooring. I then, where no openings or other special provisions are required, lay the first layer of tiling in successive courses from wall to wall, placing the tension rods in the hollows between the tiles, as shown in section in Fig. 6, filling in about the rods and between the tiles with cement, and covering the tops of the tiles with a thin layer of cement, for the succeeding upper layer of tiling to rest upon. Before laying, the tiles are wetted so that the cement may more readily cling to them and enter the pores. Each layer is thoroughly grouted, thus filling all intervening spaces and giving a thin layer of cement for the next layer of tiling. For skylight, bow windows, and like features, I make special provision. On each side of the skylight I place light plate girders A, Figs. 1, 2, 3, which form two sides of the opening and support the ends of the flooring between skylight and wall. These girders extend for some distance on each side of the skylight and distribute the load well on the adjacent flooring. In laying the tiling I place the hollows in the direction of the tension rods, *i. e.* across the shorter diameter of the floor. This brings the compressive stresses on the webs and flanges of the tile and insures a floor of very much greater strength and rigidity than where the hollows run at right angles to the rods. This has been conclusively demonstrated by carefully made tests. As the compressive stresses are brought almost entirely upon the upper portions of the tiling and the tensile strains occur in the lower side of the floor, the rods or cables readily support the tensile strains, and the upper layer, the compression while the hollows with the lateral walls of the tiles form a light openwork web rigidly connecting and binding these tension and compression members; it being only necessary to increase the thickness of the floor for greater loads or greater spans.

In other applications filed herewith I have set forth at length the uses, functions, and most approved forms of my tension rods, and, I therefore omit such details from this patent.

In Figs. 2 and 3 are shown longitudinal sections of the flooring taken on one side of it. From these views my mode of supporting the short spans of floor between skylight and wall may clearly be seen, the ends of these spans resting on flanges of girders.

In Figs. 4 and 7 is illustrated my method of supporting a projecting portion of flooring where it extends beyond the supporting wall to form the foundation for a bow window or other extension. In such a case, the stresses are inverted, for the uppermost layer is the one in tension. I therefore provide the top layer with tension rods to resist the tensile forces and run the rods some distance within the interior portion of the floor in order that they may be well anchored. Such construction is the mere application of cantalever principles to my mode of forming floors. In Fig. 3 is also shown a steam or other pipe or tube embedded in a channel left between adjacent tiles and surrounded by cement. At D is shown the pipe, surrounded by terra cotta tubing C, which may be split for convenience of laying, and may be surrounded, when in place, by fine cement. This gives a well protected passage for piping without in any wise weakening the floor. Where an extension of the flooring is supported by an extension of the foundation or wall, the floor construction already described is continued as shown in Fig. 6.

I find it convenient in many cases, especially where harder grades of tiling are used, to so shape the tiles in the upper layer that wedge shaped channels are formed between adjacent blocks and strips of wood E, of like shape, may be fitted into them, as shown in Fig. 8. The wooden strips are put in place after each course has been completed and the next course, well faced with cement, then laid beside it firmly keying the strips between them. The finished wood flooring may be secured directly to these strips.

In Fig. 9 I show another form of flooring the process of putting up being somewhat different from that heretofore described. Instead of laying the tiles upon the close form and placing the tension rods between them, in this case I embed the rods in a layer of cement laid directly on the form. The tiling of one, two, or more layers, according to the thickness and strength needed, is then laid upon the layer of cement; and a final layer of cement, with or without rods, may be added above the uppermost layer of tiles.

I may modify this construction by placing thin tiles below the bottom layer of cement, as shown in Fig. 11. These thin tiles should be well scored or roughened to better insure their clinging to the cement. I may also introduce slabs or blocks of terra cotta between the rods or cables, as in Fig. 10, and thereby save much cement. Or I may form the facing tiles with inward-projecting portions serving the same purpose, as hereinafter described in connection with Fig. 17. These forms, which may be decorated to form an ornamental ceiling, are better for protection against fire than the forms with exposed plastering at the bottom; for the tiles are far less affected by the action of heat.

Figs. 12 and 13, clearly show how washers of large size, placed at proper intervals along the tension rods, fit between the lower tiling and form anchorage for the rods, relieving the cement from undue shearing strains. Moreover with this construction, the washers besides firmly binding the structure together greatly add to the strength of the floor by distributing the stress on the cable over a large surface of tile. To this form of my invention, where great strength without great thickness is required, I attach special importance, and I am aware of no other construction by which such result may be obtained without the added weight of I-beams or other iron work capable of withstanding, unaided, both the tensile and the compression strains.

Special forms of tiling are not required, as almost any form may be used by proportioning the number of layers according to the strength and size of the tiles.

Figure 14:
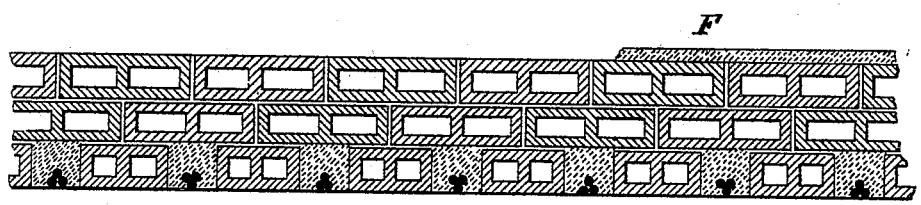

In Fig. 14 is shown a floor made of a common form of tile. In building this, tension cables are first laid upon the close form or supported a half inch or more above it; courses of tile, are laid between the rods leaving channels about the rods; and a grout of fine cement is then poured in the channels, entirely filling them level with the upper surfaces of the tiles. Two or more layers of tiling are now added the joints being carefully cemented and each layer being well grouted. A thin layer F of suitable composition may be spread above the tile work to form the finished surface for floor, or sidewalk. This feature of the floor surface, being alternative to the wooden flooring and dovetailed cleats also described and claimed in this patent, forms the subject of detail claim in another application and is merely introduced in this case to illustrate a variety of finished floors as covered by my broader claims.

Figure 15:
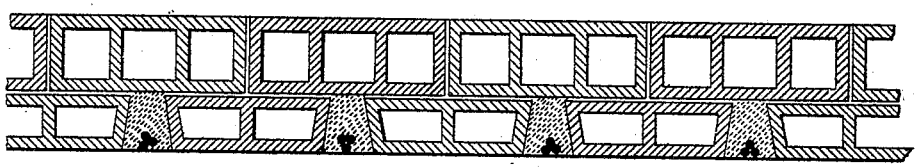
Figure 16:
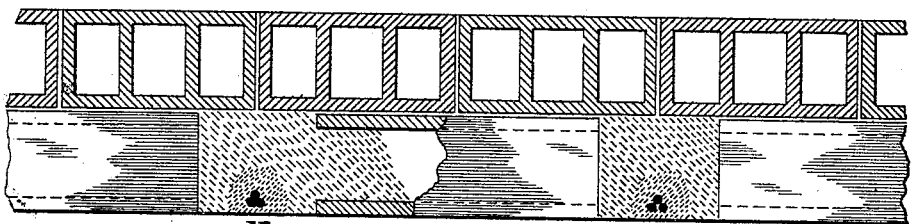

I may modify this last construction by substituting special wedge shaped blocks between the rods, as shown in Fig. 15, thereby more surely and firmly securing the lower layer of tiling to the tension rods and upper layers. Or, I may, as in Fig. 16, fill in between the rods with tiles set at right angles to the rods and to the upper layers. In this case I in-case the tension rods with fine hard cement B and fill around this with coarse concrete extending into the hollows of the lower tiles to hold them firmly in place.

Figure 17:
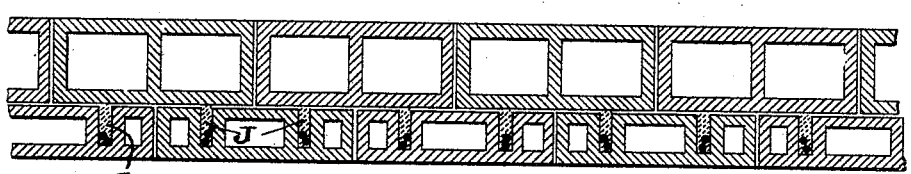

I have devised a special form of tile, for the bottom layer, which is shown in Fig. 17. This consists of a tile provided with deep channels J for the rods, and thereby saves much cementing and labor and at the same time gives all the advantages possessed by a protective layer or surface of tiling beneath the floor.

Figure 18:
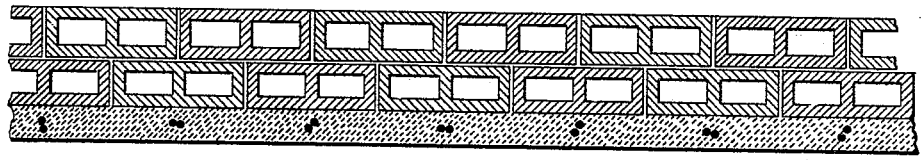
Figure 19:
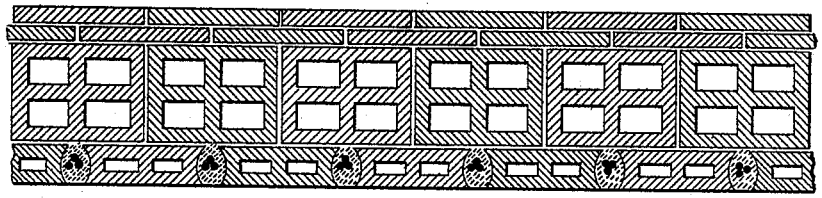

In Fig. 18 I show a light floor construction similar to that described in reference to Fig. 10 but the bottom layer of tiles is omitted, enabling me to use but one form of tile. Where great loads are to be carried, or where thin floors or long spans occur, I may reinforce the upper tiling by one or more superposed layers of flat tiles. This is virtually a mere increase in the thickness and compressive strength of the upper tile walls, at the line where most stress occurs. Such construction is shown in Fig. 19. When this is used together with the strong tension rod construction described in referring to Figs. 12 and 13, an exceedingly strong, thin, light floor may be made; the material is almost entirely distributed over the parts receiving greatest stresses, and therefore maximum strength is obtained for a given weight and thickness of material.

Figure 20:
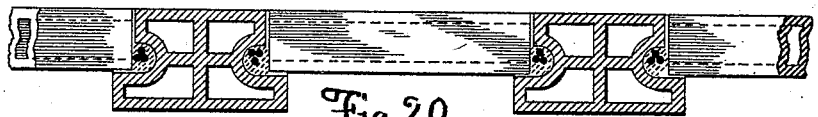

In Fig. 20 I show a section of flooring or roofing arranged for covering passages for heated gases. To more surely protect the cementing about the cable and in the joints, alternate tiles project beneath the others, and the hollows within the projecting portions afford effective protection against the heat. I merely show this form to illustrate one of several alternative constructions coming within the principle of my invention and within the claims based upon certain of its features; for the details of this form being alternative, are made the subject of another patent.

For stairways I employ a construction, similar to my floors, as shown in Figs. 21 and 22. The support for the stairs is a strip of tile flooring of suitable width, set in inclined position. On its upper surface are cemented the tread supports, which preferably consist of single tiles of triangular cross section—Fig. 23—grooved or fluted on the sides that are to be cemented to the inclined support. To these triangular tiles the finished treads, faces, and moldings, of slate, marble, or wood, may be attached, forming a light thoroughly fire proof stairway. This is of the greatest value, on account of the fact that fire almost invariably rushes up the stairways and shafts of buildings and in this way communicates from story to story.

For arches not in equilibrium I use tiles similar to those shown in section in Fig. 24, a groove or channel being provided for the reception of tension rods. The channels and rods are placed on the faces of the arch wherever tensile strains occur, i. e. on the concave face at the center and the convex face at the sides, as shown in dotted lines in the figure. The tension rods cemented in the channels relieve the tiles, in the way already set forth in connection with the floor construction, and effect a strong light fire proof arch.

I have now set forth the principal forms of my invention and the manner in which I employ fire proof tiles and tension rods. In selecting the tiles I very much prefer the light porous tiles known as terra cotta lumber; for besides being light in weight and possessing the requisite strength they present an excellent surface for the adhesion of the cement, are readily cut and trimmed as needed, and are far less brittle than the denser grades of tiles.

Of course any other suitable material may be used, such for instance as compositions of sawdust and plaster of paris, paper, straw, fibrous brick, plaster board, &c.

After a floor is finished piping may be laid by merely cutting out the upper wall of a course of tiles, laying the pipe in the exposed hollow then filling in flush to the surface with cement, or electric, gas, and other conductors, may more conveniently be run through the hollows of the tiles when the floors are being laid.

Roofs, areas, and like constructions may be built on close forms and the forms removed when the cement has thoroughly hardened. Repairs and alterations are readily made by erecting a suitable support, and laying my rods and tile work in whatever manner may be needed or desired.

My invention is of great value for sidewalks and areaways over basements, as a layer of hard cement above the tiles completes the structure. For hallways a layer of ornamental tiles may be added. As there is no lateral thrust in my form of flooring, I do not require heavy walls, nor I-beams and tie rods to sustain them; it being only necessary to anchor or otherwise secure the floors in place. To more securely relieve the cement from the excessive shearing strain which might otherwise occur near the ends of spans, I place large washers on the ends of my tension rods, as shown in the drawings, and thereby obtain bearing surface on the ends of the tiles in order that the tiles support these strains. Such a construction is shown in a patent issued to me, No. 461,028, dated October 13, 1891. In the same patent are shown the combination of tiles provided with channels, and tension rods running in such channels. I do not therefore in the present patent claim broadly such a construction.

I am aware that heretofore floors of hard setting compositions have been designed with iron work embedded in their lower portions, and that tension bars have been applied at the bottom to the work to receive the tensile strains. So also bricks have been made with channels for such bars.

My invention is distinguished clearly from all such prior efforts by many important features, among which may be named the combination of blocks for the body of the flooring with tension rods laid directly under such blocks and secured to them by cement.

Several combinations similar in principle to arches and trusses of brickwork or other blocks with tension rods tying them together, have been used before my invention; but none of them involve the principles of a beam for transverse loads, which underlie my invention and produce the simplicity and uniformity of construction which characterizes it.

What I claim as new, and desire to secure by these Letters Patent, is the following:

1. In combination in a floor, roof, bridge, or like structure, one or more layers of hollow tiles cemented together, and a layer of hollow tiles and tension rods cemented together and to the first said layer, thereby forming tension and compression members, with a hollow web between, substantially as, and for the purposes set forth.

2. In combination in a floor, roof, bridge, or like structure, one or more layers of hollow tiles cemented together, and a layer containing tension rods in cement, the upper walls of the said hollow tiles forming a compression member and the hollows and lateral walls of the said tiles forming a web between such member and the said tension rods, substantially as, and for the purposes, set forth.

3. In combination in a floor, roof, bridge, or like structure, one or more layers of hollow tiles cemented together, tension rods secured beneath the said layer or layers, and one or more layers of compression-resisting tiles upon the said hollow tiles, forming with the upper walls of the said hollow tiles a compression member separated from the said tension rods by a web of hollow tiling, substantially as, and for the purposes, set forth.

4. In combination in a floor, roof, bridge or like structure, a layer of light tiling, tension rods secured beneath the said light tiling, and a layer of heavier compression-resisting tiling secured above the said light tiling, whereby distinct tension and compression members are formed separated by a light web, substantially as, and for the purposes, set forth.

5. In combination in a floor, roof, or like structure, a layer of tiles cemented together and a layer of tiles and tension rods cemented together and to the first said layer, the said rods being provided with washers or other projections fitting between the tiles, substantially as, and for the purposes, set forth.

6. In combination in a floor, roof, or like structure, a layer of material arranged to sustain the compressive strains of the said structure, a second layer of material arranged to sustain the tensile strains, and a skylight or other frame provided with supporting beams or projections for distributing the load upon the adjacent parts of the structure, and flanges for sustaining the said frame in the said structure and for supporting the ends of the short spans between the said frame and the edge of the said structure, substantially as set forth.

7. A sky-light or like frame provided with projecting beams or supports for distributing the load upon the adjacent parts of tile flooring and like structures substantially as, and for the purposes, set forth.

8. In combination in a floor, roof, or like structure, a layer of tiles cemented together, a pipe or other conduit embedded in the said layer and surrounded by cement, and a layer of tiles and tension rods cemented together and to the first said layer, substantially as set forth.

9. In combination in a floor, roof, or like structure, one or more layers of tiling cemented together to form a united layer capable of bearing the compressive strains of the said structure, a second layer provided with tension rods and constructed to sustain the tensile strains of the said structure, and one or more intermediate layers or web of hollow tiling secured to the first and second said layers, substantially as, and for the purposes, set forth.

10. In combination in a floor, roof, or like structure, one or more layers of tiles cemented together, a layer containing tension rods embedded in cement, and a facing of tiles secured to the second said layer, substantially as, and for the purposes, set forth.

11. In combination in a floor, roof, or like structure, one or more layers of tiles cemented together, a layer containing tension rods embedded in cement, and a facing of tiles secured to the second said layer and provided with block shaped portions for filling in between the tension rods and reducing the amount of cement, substantially as, and for the purposes, set forth.

12. A facing tile, for use substantially as described, provided with one or more hollow block shaped portions for filling in between the tension rods.

In testimony whereof I have hereunto set my hand this 11th day of April, 1892.

THOMAS A. LEE.

Witnesses:
  CHAS. M. BEAM,
  HAROLD BONNER.